United States Patent [19]

Wong

[11] Patent Number: 5,530,611
[45] Date of Patent: Jun. 25, 1996

[54] PHOTO CHOPPER CIRCUIT WITH FAIL-SAFE MEANS

[75] Inventor: Ron Wong, Taipei Hsien, Taiwan

[73] Assignee: Jaeger Industrial Co., Ltd., Taipei Hsien, Taiwan

[21] Appl. No.: 455,600

[22] Filed: May 31, 1995

[51] Int. Cl.⁶ ........................... H02H 3/20
[52] U.S. Cl. ................. 361/56; 361/84; 361/18
[58] Field of Search ............... 361/18, 91, 84, 361/56, 111, 58

[56] References Cited

U.S. PATENT DOCUMENTS 3,870,899  3/1975  Stoffer et al. ............... 361/91
4,807,083  2/1989  Austin ........................ 361/111
4,999,729  3/1991  Stifter et al. ................ 361/111

*Primary Examiner*—Todd DeBoer
*Attorney, Agent, or Firm*—Jacobson, Price, Holman & Stern

[57] ABSTRACT

A photo chopper circuit consisting of a photo chopper, an overvoltage detection/control device, a power switch, and a protective diode for connection to the power supply line, voltage detection line, and ground terminal of a satellite antenna allocator, wherein if the photo chopper is erroneously connected to the voltage line of the satellite antenna allocator for motor drive or the power supply line of the satellite antenna allocator, the overvoltage detection/control device is turned on to switch off the power switch or, the protective diode reverses flow of voltage to protect the photo chopper.

5 Claims, 3 Drawing Sheets

PHOTO CHOPPER CIRCUIT WITH FAIL-SAFE MEANS

BACKGROUND OF THE INVENTION

The present invention relates to photo choppers, and relates more particularly to a photo chopper circuit for connection to the power supply line, voltage detection line, and ground terminal of a satellite antenna allocator wherein if the photo chopper is erroneously connected to the voltage line of the satellite antenna allocator for motor drive or the power supply line of the satellite antenna allocator, its overvoltage detection/control device is turned on to switch off the power switch or, its protective diode reverses flow of voltage to protect the photo chopper.

FIG. 3 shows a photo chopper according to the prior art, which is generally comprised of an infrared emitting diode LED, a photoresistor OPT, a plurality of resistors R11, R12, and R13, and a transistor Q1. The emitter of the phototransistor OPT is respectively connected to one end of the emitter resistor R12 and the base of the transistor Q1. The collector of the phototransistor OPT is respectively connected to one end of the resistor R11 and the +5 V power supply terminal of the satellite antenna allocator 10. The opposite end of the resistor R11 is connected to the positive terminal of the infrared emitting diode LED. The negative terminal of the infrared emitting diode LED is connected to the opposite end of the resistor R12 and the emitter of the transistor Q1 and the ground (GND) terminal of the satellite antenna allocator 10. The collector of the transistor Q1 is connected to the voltage detection terminal (SENSOR) of the satellite antenna allocator 10 through the resistor R13. When the photo chopper is in use, it must be properly installed as above described. If the +5 V voltage and output voltage of the photo chopper are reversely connected to the power supply line of the satellite antenna allocator, or erroneously connected to the voltage line terminals M1 and M2 of the satellite antenna allocator for motor drive, the photo chopper will be burnt or damaged.

SUMMARY OF THE INVENTION

The present invention has been accomplished under the circumstances in view. It is one object of the present invention to provide a photo chopper circuit which has fail-safe means to protect the photo chopper when the circuit is erroneously connected to the high-tension voltage line of the satellite antenna allocator for motor drive. It is another object of the present invention to provide a photo chopper circuit which has fail-safe means to protect the photo chopper when the circuit is erroneously connected to the reversed voltage line of the satellite antenna allocator. It is another object of the present invention to provide a photo chopper circuit with fail-safe means which is simple in structure and inexpensive to manufacture. To achieve these objects, there is provided a photo chopper circuit comprised of a photo chopper, an overvoltage detection/control device, a power switch, and a protective diode for connection to the power supply line, voltage detection line, and ground terminal of a satellite antenna allocator. If the photo chopper is erroneously connected to the voltage line of the satellite antenna allocator for motor drive or the power supply line of the satellite antenna allocator, the overvoltage detection/control device is turned on to switch off the power switch or, the protective diode reverses flow of voltage to protect the photo chopper.

DETAILED DESCRIPTION OF THE PREFERRED EMBODIMENT

Figure 1:
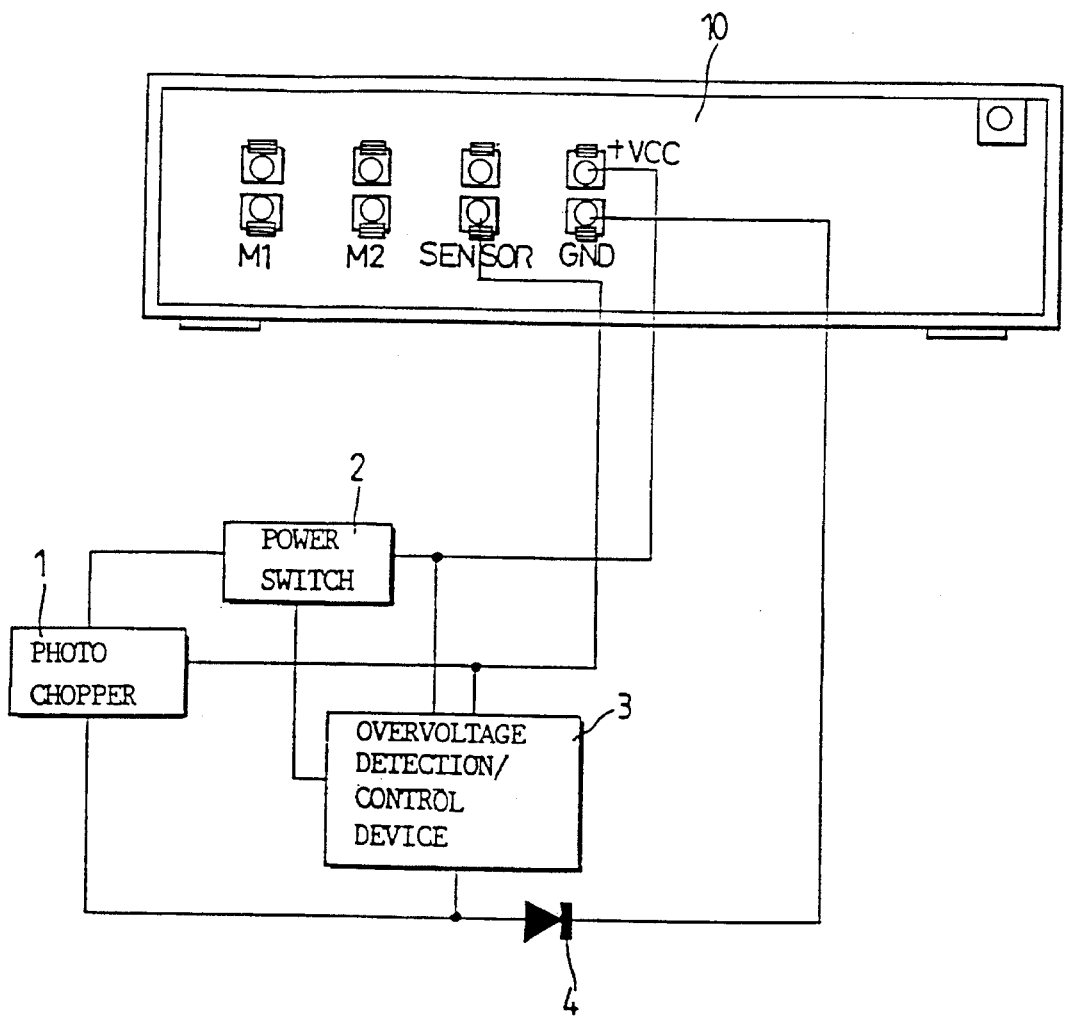
FIG. 1 is a block diagram showing the photo chopper circuit of the preferred embodiment of the present invention connected to a satellite antenna allocator.

Referring to FIG. 1, a photo chopper circuit in accordance with the present invention is generally comprised of a photo chopper 1, a power switch 2, an overvoltage detection/control device 3, and a protective diode 4.

Referring to FIG. 1 again, the photo chopper 1 is to detect the turning angle of the motor of a motor drive (not shown), and to provide a pulse voltage output, subject to its detection, to the voltage detection terminal (SENSOR) of the satellite antenna allocator 10. The power switch 2 is connected between the photo chopper 1 and the VCC terminal of the satellite antenna allocator 10. The opposite end of the photo chopper 1 is connected to the positive terminal of the protective diode 4. The negative terminal of the protective diode 4 is connected to the ground terminal (GND) of the satellite antenna allocator 10. The overvoltage detection/control device 3 is connected between the internal circuit of the power switch 2 and the positive terminal of the protective diode 4, and also connected to the VCC terminal and voltage detection terminal (SENSOR) of the satellite antenna allocator 10.

Figure 2:
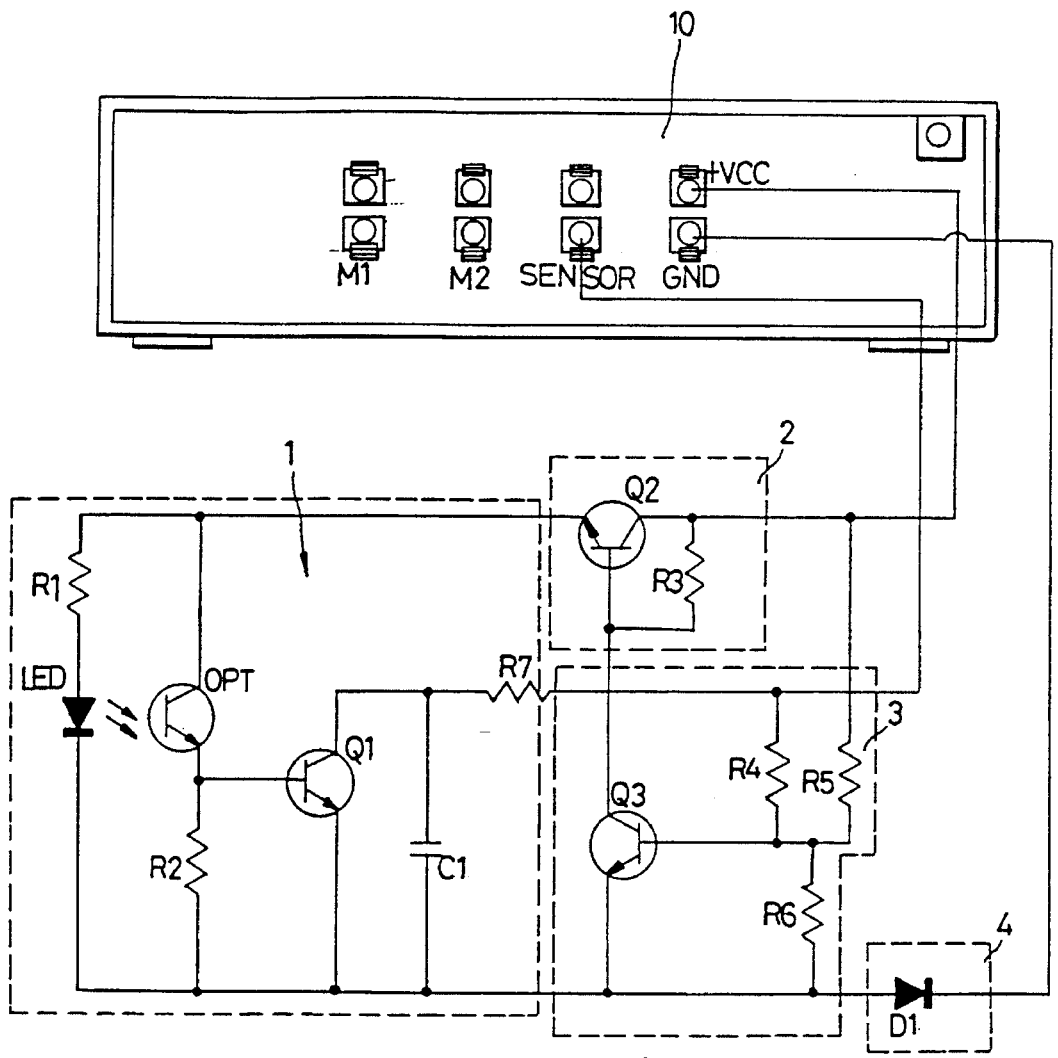
FIG. 2 is a circuit diagram showing the photo chopper circuit of the preferred embodiment of the present invention connected to the satellite antenna allocator.
Figure 3:
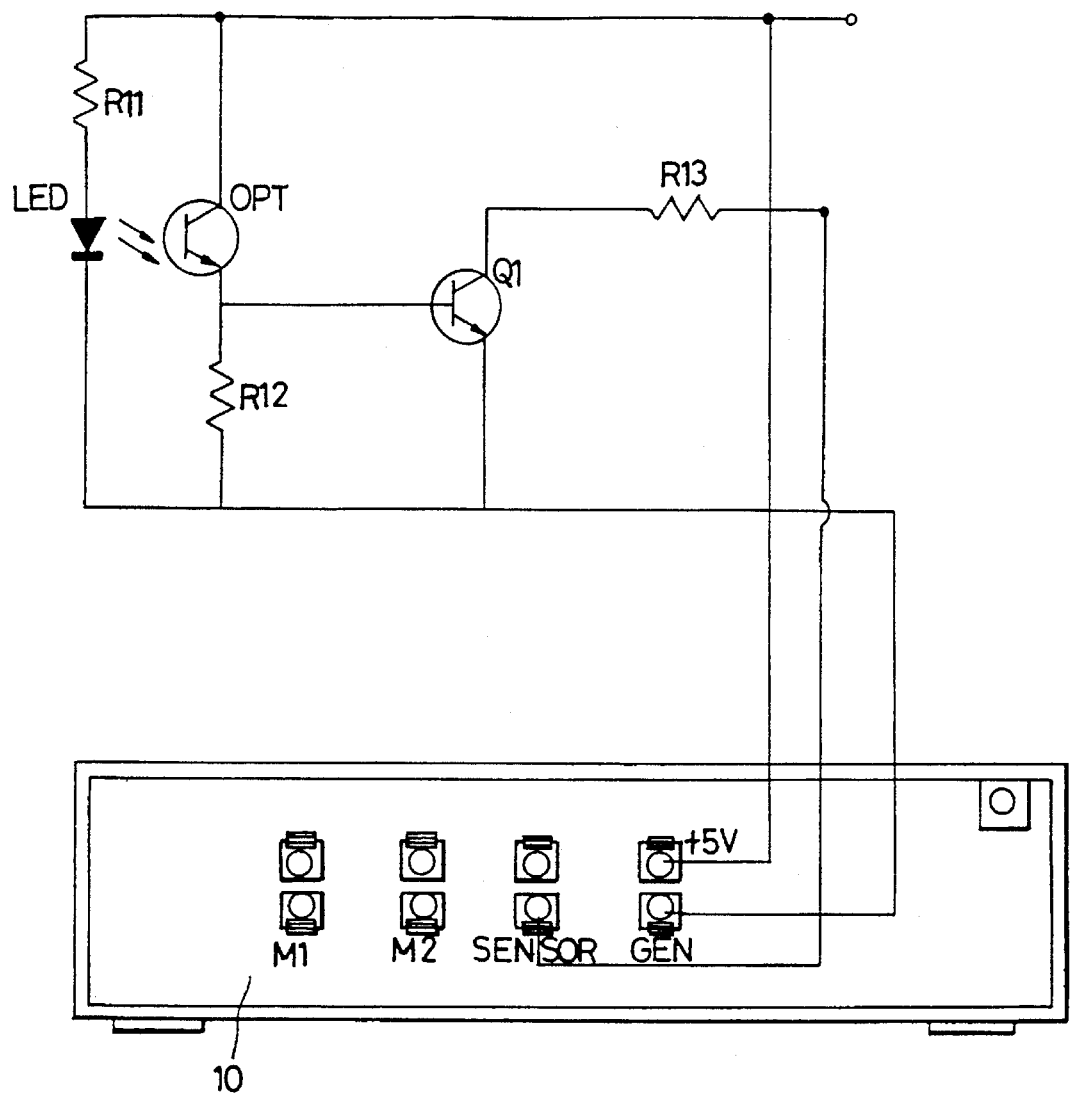
FIG. 3 is a circuit diagram showing a prior art chopper circuit connected to the satellite antenna allocator.

Referring to FIG. 2, the overvoltage detection/control device 3 is comprised of a transistor Q3, and a plurality of shunt resistors R4, R5, and R6. The base of the transistor Q3 is connected to the voltage detection terminal (SENSOR) and VCC terminal of the satellite antenna allocator 10 through the shunt resistor R4 and the shunt resistor R5 respectively. The collector of the transistor Q3 is connected to the power switch 2. The base of the transistor Q3 is connected through the shunt resistor R6 to the positive terminal of the protective diode D1. The positive terminal of the protective diode D1 is also connected to the emitter of the transistor Q3. The negative terminal of the protective diode D1 is connected to the ground terminal (GND) of the satellite antenna allocator 10. The power switch 2 is comprised of a transistor Q2 and a bias resistor R3. The emitter of the transistor Q2 is connected to the photo chopper 1. The collector of the transistor Q2 is connected to the VCC terminal of the satellite antenna allocator 10. The base of the transistor Q2 is connected to the transistor Q3 of the overvoltage detection/control device 3. The bias resistor R3 is connected between the base and collector of the transistor Q2. The photo chopper 1 is comprised of an infrared emitting diode LED, a phototransistor OPT, a transistor Q1, a capacitor C1, and a plurality of resistors R1, R2, and R7. The emitter of the phototransistor OPT is connected to one end of the resistor R2 and the base of the transistor Q1. The collector of the phototransistor OPT is connected to one end of the resistor R1 and the emitter of the transistor Q2 of the power switch 2. The opposite end of the resistor R1 is connected to the negative terminal of the positive terminal of the infrared emitting diode LED. The negative terminal of the infrared emitting diode LED is connected to the opposite end of the resistor R2 (relative to the phototransistor OPT).

The emitter of the transistor Q1 is connected to the emitter of the transistor Q3 of the overvoltage detection/control device 3. The collector of the transistor Q1 is connected through the resistor R7 to the voltage detection terminal (SENSOR) of the satellite antenna allocator 10. The capacitor C1 is connected between the collector and emitter of the transistor Q1.

Through the aforesaid arrangement, the chopper i works with the satellite antenna allocator 10 normally. If the output voltage of the photo chopper 1 is connected to the high-tension lines (M1, M2) of the satellite antenna allocator 10 for driving the motor drive, or its power supply voltage is connected to the high-tension lines (M1, M2) of the satellite antenna allocator 10 for driving the motor drive, the high voltage of the servo motor will be sent through the shunt resistors R4 and R6 or the shunt resistors R5 and R6 to trigger the transistor Q3, causing the transistor Q2 to turn off the photo chopper 1, and therefore, the photo chopper 1 is protected. If the power supply voltage and output voltage of the photo chopper 1 are erroneously connected to the VCC terminal and ground terminal (GND) of the satellite antenna allocator 10 the protective diode 4 prohibits reverse flow of voltage from damaging the photo chopper 1, and therefore the photo chopper 1 is protected.

It is to be understood that the drawings are designed for purposes of illustration only, and not intended as a definition of the limits and scope of the invention disclosed.

I claim:

1. A photo chopper circuit comprised of a photo chopper, a power switch, an overvoltage detection/control device, and a protective diode, said photo chopper being to detect the turning angle of the motor of the motor drive and to send the detected signal to the voltage detection terminal (SENSOR) of a satellite antenna allocator, said photo chopper having one end connected through said power switch to the VCC terminal of said satellite antenna allocator and an opposite end connected to the positive terminal of said protective diode, the negative terminal of said protective diode being connected to the ground terminal (GND) of said satellite antenna allocator, said overvoltage detection/control device being connected to between the internal circuit of said power switch and the positive terminal of said protective diode, and connected to the VCC terminal and voltage detection terminal (SENSOR) of said satellite antenna allocator, wherein if the output voltage of said photo chopper is connected to the high-tension lines (M1, M2) of said satellite antenna allocator for driving said motor drive, or its power supply voltage is connected to the high-tension lines (M1, M2) of said satellite antenna allocator for driving said motor drive, the power switch will be switched off by said overvoltage detection/control device to turn off said photo chopper so as to protect said photo chopper from damage; if the power supply voltage and output voltage of said photo chopper are erroneously connected to the VCC terminal and ground terminal (GND) of said satellite antenna allocator, said protective diode prohibits reverse flow of voltage from damaging said photo chopper, and therefore said photo chopper is protected.

2. The photo chopper circuit of claim 1 wherein said overvoltage detection/control device is comprised of a transistor Q3, and a plurality of shunt resistors R4, R5, and R6, the base of said transistor Q3 being connected to the voltage detection terminal (SENSOR) and VCC terminal of said satellite antenna allocator through said shunt resistor R4 and said shunt resistor R5 respectively, the collector of said transistor Q3 being connected to said power switch, the base of said transistor Q3 being connected through said shunt resistor R6 to the positive terminal of said protective diode D1, the positive terminal of said protective diode D1 being also connected to the emitter of said transistor Q3, the negative terminal of said protective diode D1 being connected to the ground terminal (GND) of said satellite antenna allocator.

3. The photo chopper circuit of claim 1 wherein said power switch is comprised of a transistor Q2 and a bias resistor R3, the emitter of said transistor Q2 being connected to said photo chopper, the collector of said transistor Q2 being connected to the VCC terminal of said satellite antenna allocator, the base of said transistor Q2 being connected to said transistor Q3 of said overvoltage detection/control device, said bias resistor R3 being connected between the base and collector of said transistor Q2.

4. The photo chopper circuit of claim 2 wherein said overvoltage detection/control device can be comprised of other equivalent elements subject to different designs.

5. The photo chopper circuit of claim 3 wherein said power switch can be comprised of other equivalent elements subject to different designs.

* * * * *